United States Patent [19]

Liebl

[11] Patent Number: 4,750,320
[45] Date of Patent: Jun. 14, 1988

[54] ROTARY CUTTING BLADE HAVING REPLACEABLE CUTTING EDGE

[76] Inventor: Thomas J. Liebl, R.R. 1, Donnelly, Minn. 56235

[21] Appl. No.: 47,725

[22] Filed: May 7, 1987

[51] Int. Cl.⁴ .................... A01D 34/73; A01D 34/52
[52] U.S. Cl. .................................................. 56/295
[58] Field of Search ........................................ 56/295

[56] References Cited

U.S. PATENT DOCUMENTS

| | | | |
|---|---|---|---|
| 2,924,059 | 2/1960 | Beeston Jr. | 56/295 |
| 3,097,468 | 7/1963 | Johnson | 56/295 |
| 3,327,460 | 6/1967 | Blackstone | 56/295 |
| 3,395,521 | 8/1968 | Crockett et al. | 56/295 |
| 3,447,291 | 6/1969 | Guetterman | 56/295 |
| 3,563,015 | 2/1971 | Renfroe | 56/295 |
| 3,665,692 | 5/1972 | Hughes | 56/295 |
| 4,445,315 | 5/1984 | Roszkowski | 56/295 |
| 4,651,510 | 3/1987 | Malutich | 56/295 |

*Primary Examiner*—Paul J. Hirsch
*Attorney, Agent, or Firm*—Dorsey & Whitney

[57] ABSTRACT

A rotary lawn mower blade includes removable cutting tips snapably mounted on a blade base member. The blade can be provided with a new cutting edge by replacing the worn cutting tips with new tips without the need for removing the entire blade from the lawn mower drive spindle.

6 Claims, 2 Drawing Sheets

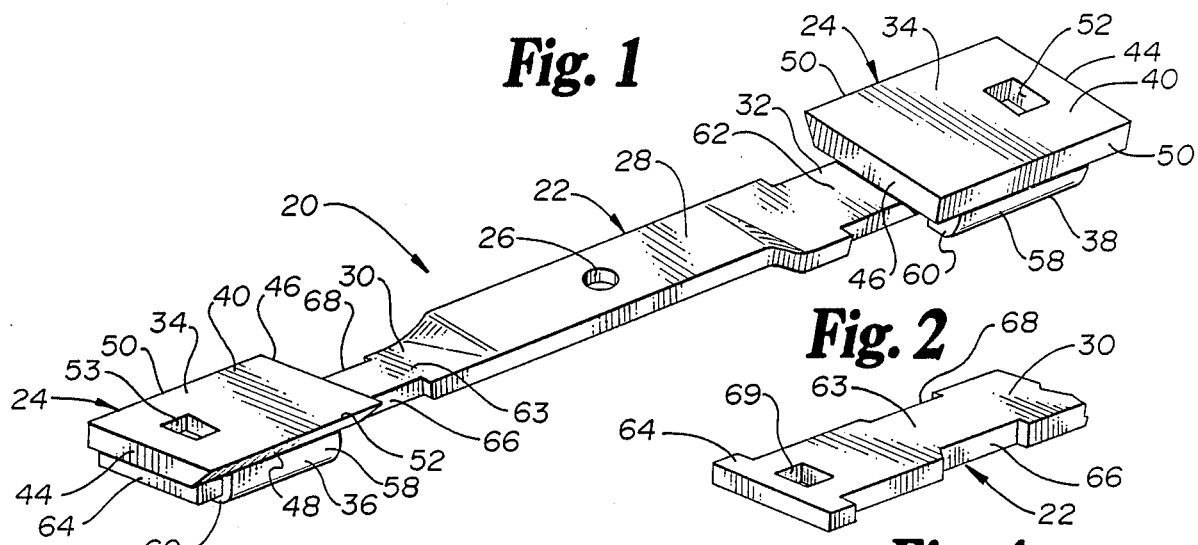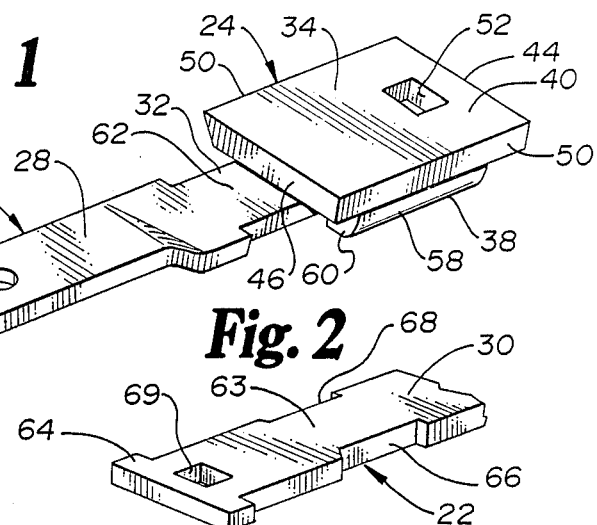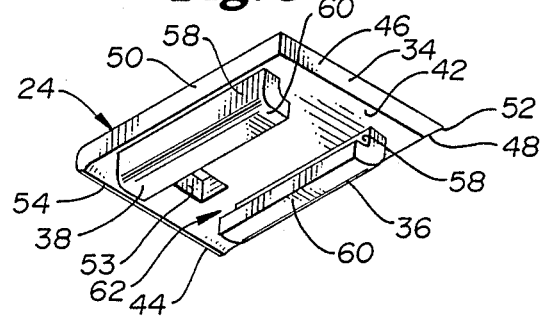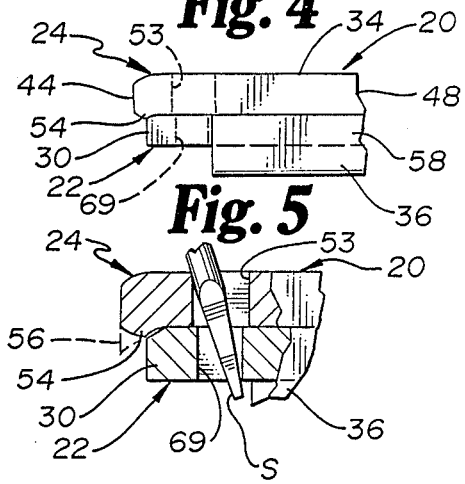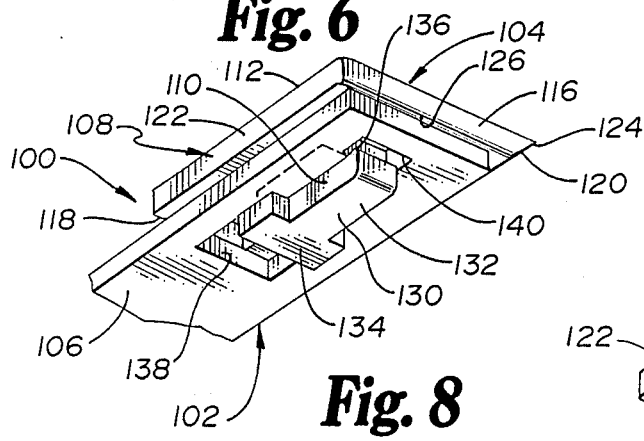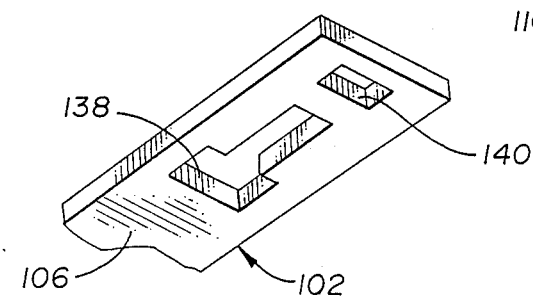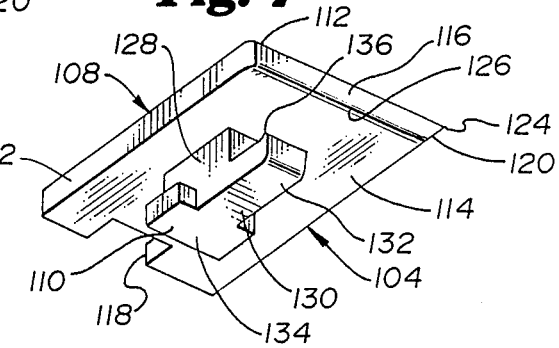

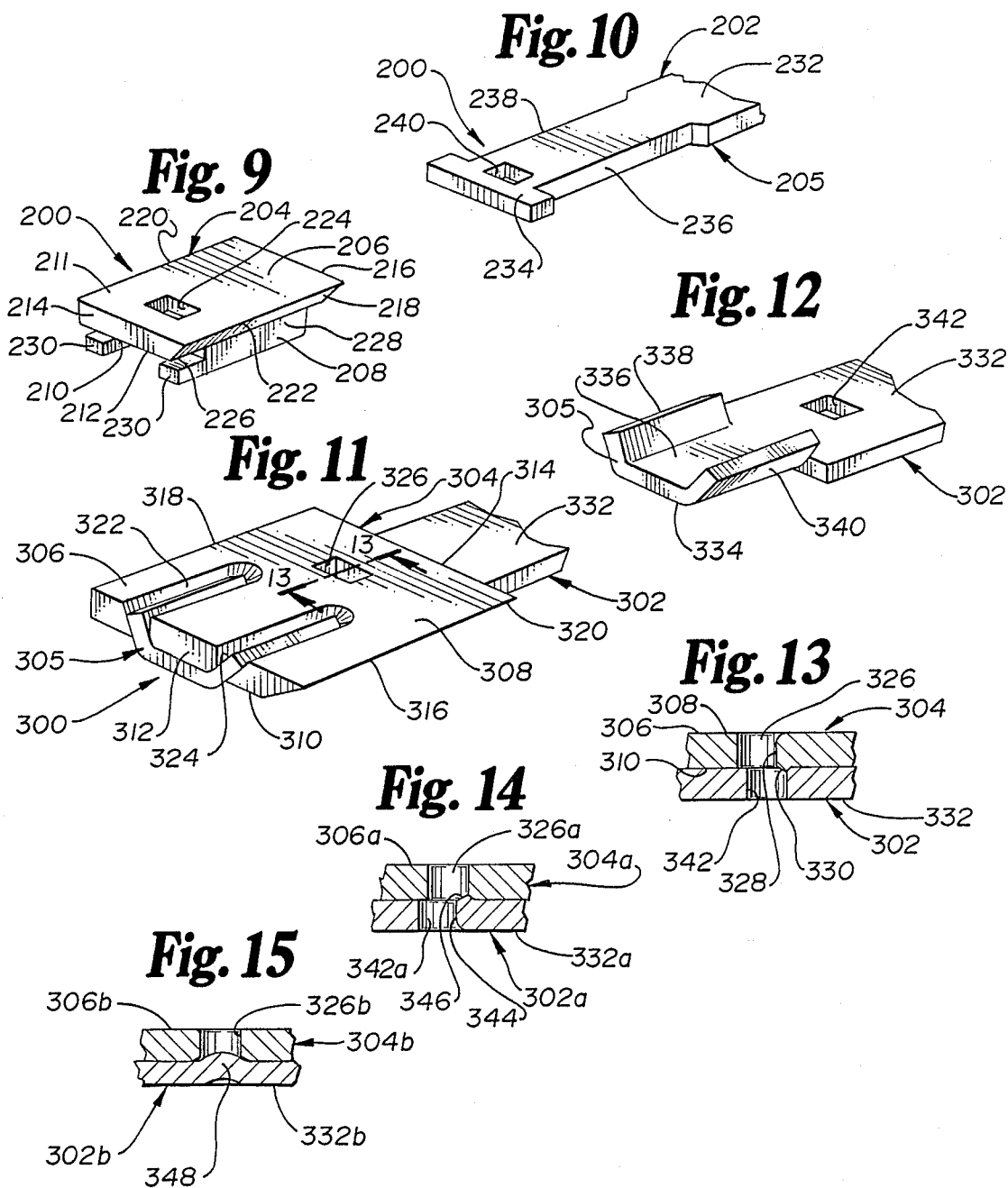

ROTARY CUTTING BLADE HAVING REPLACEABLE CUTTING EDGE

TECHNICAL FIELD

This invention relates to lawn care machinery. In particular, it relates to a rotary lawn mower blade having a replaceable cutting edge.

BACKGROUND ART

Lawn mowing equipment using a single blade rotated in a plane parallel to the ground has largely replaced reel type lawn mowers. The blade of a rotary mower is rotated at high speeds, severing individual blades of grass as the blade passes through the grass. The currents of air generated by the rotating blade generally cause the blades of grass to be lifted upright as the rotary lawn mower advances over the ground, thereby contributing to an even cut.

The cutting edge of a rotary lawn mower blade is subject to extreme operating conditions. The blade is rotated at high speeds, and can frequently come into contact with sticks, rocks, and other debris located on the ground. Maintaining the cutting edge of a rotary mower blade in a sharpened condition is important to the evenness and cleanness of the cut. In particular, a dull blade tends to tear, rather than sever, individual blades of grass, detracting from the overall health of the individual blades of grass, and from the overall appearance of the lawn.

Heretofore, maintaining the blade of a rotary lawn mower has entailed the time-consuming, and often difficult, job of completely removing the blade from the mower. A rotary blade having a cutting edge that could be replaced without complete removal of the blade from a lawn mowing machine would provide a decided advantage.

SUMMARY OF THE INVENTION

The blade for a rotary lawn mower described herein includes a blade cutting edge that can be replaced without removal of the blade from the lawn mowing machine. The blade includes a base member adapted for permanent attachment to the mower drive spindle and a pair of replaceable blade tips each having a blade tip cutting edge. The blade tips can be easily snapped into and out of a secure operating position on the blade with the use of a screwdriver or similar tool.

BRIEF DESCRIPTION OF THE DRAWINGS

FIG. 1 is a perspective view of a blade having a replaceable blade cutting edge in accordance with the present invention;

FIG. 2 is a fragmentary, perspective view of one end of the mower blade base member with the blade tip removed;

FIG. 3 is a perspective view of the blade tip;

FIG. 4 is a fragmentary, elevational view of one end of the mower blade in accordance with the present invention;

FIG. 5 is a fragmentary, sectional view of one end of a mower blade in accordance with the present invention, depicting a screwdriver positioned for snapably installing a blade tip on the blade;

FIG. 6 is a fragmentary, perspective view of a second embodiment of a rotary mower blade in accordance with the present invention;

FIG. 7 is a perspective view of the replaceable blade tip of FIG. 6;

FIG. 8 is a fragmentary, perspective view of the blade base member of FIG. 6;

FIG. 9 is a perspective view of a blade tip of a rotary mower blade in accordance with a third embodiment of the invention;

FIG. 10 is a fragmentary, sectional view of the blade base member of a rotary mower blade in accordance with the third embodiment of the invention;

FIG. 11 is a fragmentary, perspective view of a rotary mower blade in accordance with a fourth embodiment of the invention;

FIG. 12 is a fragmentary, perspective view of one end of the blade base member of the rotary mower blade depicted in FIG. 11;

FIG. 13 is a fragmentary, sectional view taken along the line 13—13 of FIG. 11;

FIG. 14 is a fragmentary, sectional view taken along the same line 13—13 of FIG. 11, but depicting an alternative blade tip retention mechanism; and FIG. 15 is a fragmentary, sectional view again taken along the line 13—13 of FIG. 11, but showing a second alternative blade retention mechanism.

DETAILED DESCRIPTION OF THE DRAWINGS

Referring to the drawings, a first embodiment of a rotary mower blade 20 in accordance with the present invention is depicted in FIGS. 1-5. The mower blade 20 broadly includes blade base member 22, and replaceable blade cutting tips 24. The blade base member 22 includes mounting aperture 26 for mounting the blade to the spindle of a rotary lawn mower (not shown).

Blade base member 22 includes center section 28, and opposed end sections 30, 32. The blade end sections 30, 32 are generally planar, and are tilted at opposite angles relative to each other, as measured from the plane of the center section 28.

Blade cutting tip 24 includes plate 34 and channel defining brackets 36, 38. The plate 34 includes first surface 40 and opposite second surface 42, with brackets 36, 38 fixedly attached to second surface 42. Each plate 34 further includes outwardly facing and inwardly facing margins 44, 46 oriented generally perpendicular to the longitudinal axis of blade 20, and opposed leading and trailing margins 48, 50 oriented generally parallel to the longitudinal axis of blade 20. Leading margin 48 is beveled so as to present cutting edge 52. Access hole 53 extends through plate 34 between first surface 40 and second surface 42. Outwardly facing margin 44 of plate 34 is rolled so as to form retention ridge 54 along the plate bottom surface 42. The height of retention ridge 54 can be adjusted by filing the edge 56 of rolled outwardly facing margin 44 (as depicted in phantom lines of FIG. 5).

The brackets 36, 38 each include sidewall 58 and angled top wall 60. The sidewalls 58 are oriented generally parallel to each other and perpendicular to the plane of plate surface 42. Bracket top walls 60 are oriented generally parallel to the plate surface 42, and are oriented generally within a common plane. As best depicted in FIG. 3, the brackets 36, 38 define a blade base member receiving channel 62.

Each blade end section 30, 32 comprises neck portion 63 and integral cross bar 64. The neck portion 63 includes opposed, bracket receiving recesses 66, 68. An aperture 69 extends through the neck 62 of each end section 30, 32. The height of channel 62, as defined by the vertical distance between the plate surface 42 and the inwardly facing surfaces of bracket top walls 60, is just larger than the vertical width of neck portion 12. As indicated in FIGS. 4 and 5, blade tip aperture 53 and blade neck portion aperture 69 are generally aligned when the blade tip 24 is installed on the neck 62 of blade base member 22.

The second embodiment of a mower blade 100 in accordance with the present invention is depicted in FIGS. 6-8. The mower blade 100 broadly includes blade base member 102 and opposed replaceable blade cutting tips 104 (only one tip 104 being shown). Although only one blade end section 106 is depicted in the drawings, mower blade 100 includes a center section and opposed blade end sections similar to the blade described above in connection with the first embodiment of the invention.

Blade cutting tip 104 includes plate 108 and attachment lug 110. Plate 108 includes first surface 112 and opposed second surface 114, with lug 110 fixedly attached to the bottom surface 114. Plate 108 further includes outwardly facing and inwardly facing margins 116, 118 oriented generally perpendicular to longitudinal axis of blade 100, and opposed leading and trailing margins 120, 122 oriented generally parallel to the longitudinal axis of mower blade 100. Leading margin 120 is beveled so as to present cutting edge 124. Outwardly facing margin 116 is rolled so as to form retention ridge 126 along the plate bottom surface 114.

Lug 110 includes base portion 128 and T-shaped key portion 130. Key portion 130 includes latching boss 132 oriented generally along the longitudinal axis of blade 100, and locking cross bar 134, oriented generally perpendicular to the latching boss 132. The forward tip of latching boss 132 is rolled so as to form retention ridge 136. Blade base member 102 includes T-shaped key way 138. The key way 138 is complementarily shaped to key portion 130 of blade tip attachment lug 110. Retention ridge receiving aperture 140 is located between key way 130 and the end of blade base member 102.

A third embodiment of a mower blade 200 in accordance with the present invention is depicted in FIGS. 9 and 10. The mower blade 200 broadly includes blade base member 202 and replaceable blade cutting tip 204. Although only one blade end section 205 is depicted in the drawings, mower blade 200 includes a center section and opposed blade end sections similar to the blade described above in connection with the first embodiment of the invention.

Blade cutting tip 204 includes plate 206 and attachment brackets 208, 210. Plate 206 includes first surface 211 and opposed second surface 212, with brackets 208, 210 fixedly attached to surface 212. Each plate 206 further includes outwardly facing and inwardly facing margins 214, 216 oriented generally perpendicular to the longitudinal axis of blade 200, and opposed leading and trailing margins 218, 220 oriented generally parallel to the longitudinal axis of blade 200. Leading margin 218 is beveled so as to present cutting edge 222. Blade tip aperture 224 extends through plate 206 between opposed surfaces 211, 212. Outwardly facing margin 214 is rolled so as to form retention ridge 226 along the plate surface 212.

The brackets 208, 210 are oriented generally parallel to each other and perpendicular to the plane of plate surface 212. The brackets each include base portion 228 and locking toe 230.

Blade end section 205 includes neck portion 232 and cross bar 234. The neck portion 232 includes opposed, bracket receiving recesses 236, 238, presenting a narrowed portion of the neck 232 immediately behind cross bar 234. Blade neck portion aperture 240 extends through the neck 232 of the end section 205. Blade tip aperture 224 and blade neck portion aperture 240 are generally aligned when the blade tip 204 is installed on the blade base member 202.

A fourth embodiment of a mower blade 300 in accordance with the present invention is depicted in FIGS. 11-15. The mower blade 300 broadly includes blade base member 302, and replaceable blade cutting tip 304. Although only one blade end section 305 is depicted in the drawings, mower blade 300 includes a center section and opposed blade end sections similar to the blade described above in connection with the first embodiment of the invention.

Blade cutting tip 304 comprises plate 306. Plate 306 includes first surface 308 and opposed second surface 310. Plate 310 further includes outwardly facing and inwardly facing margins 312, 314 oriented generally perpendicular to the longitudinal axis of blade 300, and opposed leading and trailing margins 316, 318. Leading margin 316 is beveled so as to present cutting edge 320. The plate 306 includes parallel, blade base member receiving slots 322, 324 extending inwardly from the outwardly facing margin 312. Center retention aperture 326 is positioned between the ends of slots 322, 324 and the blade tip inwardly facing margin 314. As depicted in FIG. 13, the edge 328 of aperture 326 nearest to the inwardly facing plate margin 314 is rolled so as to form retention ridge 330.

Blade base member 302 includes generally flat neck portion 332, and generally U-shaped in cross section end portion 334. The end portion 334 includes bottom wall 338 integral with and oriented in the same plane as neck portion 332, and opposed, blade tip receiving wings 338, 340. The blade tip receiving wings are integral with and angled upwardly from bottom wall 336. Neck portion 332 includes retention aperture 342.

Referring to FIG. 14, an alternative retention mechanism for blade 300 is depicted. The retention aperture 326a of blade tip plate 306a does not include a rolled edge. The retention aperture 342a of plate base member neck portion 332a, however, includes an edge 344 rolled so as to form retention ridge 346.

A third alternative retention mechanism for blade 300 is depicted in FIG. 15. Plate 306b of blade tip 304b includes aperture 326b. The neck portion 332b of blade base member 302b includes detent dimple 348 snapably received within aperture 326b.

In operation, the mower blade base member 22 is permanently affixed to the spindle of rotary mower, and blade cutting tips 24 are selectively detachable from the blade base member 22. The blade cutting tips 24 are installed on the blade base member 22 by first aligning the brackets 36, 38 with the bracket receiving recesses 66, 68 of neck portion 62. The surface 42 of blade cutting tip plate 34 can then be brought into contact with the base member neck portion 62. The blade cutting tip 34 is then slidably shifted forward such that the nonrecessed portion of the blade base member neck portion 62 is captured within blade base member receiving channel 62 defined by brackets 36, 38 such that the neck portion is snugly received within channel 62.

Referring to FIG. 5, a screwdriver S may be used to assist the installation of blade cutting tip 24 onto the blade base member 22. In particular, as the blade cutting tip 24 approaches the end of the blade base member 22, the retention ridge 54 provides increasing resistance to the motion of the blade cutting tip 24 relative to the blade base member 22. A screwdriver S is inserted through blade tip aperture 53 and blade neck portion aperture 69, and screwdriver S is tilted as shown so as to urge retention ridge 56 of blade tip 24 past the end of cross bar 64.

The centrifugal force generated by the rotational operation of blade 20 urges blade tip 24 continually outwardly. The blade cross bar 64 positively engages the brackets 66, 68 so as to prevent the blade tip 24 from flying off of the blade base member 22. The snug fit of the blade base member neck portion 63 within the channel 62 of blade tip 24, together with snapable engagement of retention ridge 54 with the outer margin of cross bar 64, prevents the backward sliding of blade tip 24 towards the center portion of the blade base member 22.

The blade cutting tip 24 can be easily removed from the blade base member 22 when the cutting edge 52 is worn. The screwdriver S is inserted through the access holes 53, 69, and is tilted at an angle opposite to that depicted in FIG. 5 so as to urge retention 54 over the outwardly facing margin of cross bar 64 and onto the surface 42 of the blade base member neck portion 63. The blade cutting tip 24 is then slid rearwardly along the neck portion 63 towards the center portion of blade base member 22 until the brackets 36, 38 are aligned with the recesses 66, 68 on neck portion 63. The blade cutting tip 24 is then lifted away from the blade base member 22.

The replaceable cutting tip 104 of the second embodiment of a mower blade 100 is also easily installed on and removed from blade base member 102. Installation of the blade cutting tip 104 is accomplished by first aligning lug 110 with key way 138 and inserting the lug 110 through the key way 138. The blade cutting tip 104 is then urged forwardly such that the blade base member 102 is snugly received between the blade cutting tip 108 and the latching boss 132, and between locking cross bar 134 of lug 110. When fully installed, retention ridge 126 of blade cutting tip 104 snaps over the outwardly facing margin of the blade base member, and retention ridge 136 of lug latching boss 132 is snapably received within retention ridge receiving aperture 140. Removal of the cutting tip 104 can be assisted by inserting a screwdriver or similar tool in aperture 140 and urging lug 110 inwardly.

Installation and removal of a cutting tip 204 in accordance with the third embodiment of the invention can be understood with reference to FIGS. 9 and 10. Installation is accomplished by aligning brackets 208, 210 with bracket receiving recesses 236, 238 of blade base member neck portion 232, and sliding the cutting tip 204 along the blade longitudinal axis such that the blade base member cross bar 234 is engaged between cutting tip blade 206 and the toes 230 of cutting tip brackets 208, 210. A screwdriver or similar implement can be inserted through apertures 224 and 240 of the cutting tip and neck portion respectively to assist the installation and removal of the blade cutting tip 204 to the blade base member 202 in a manner similar to that described in conjunction with the first embodiment of the invention.

Installation and removal of a cutting tip 304 in accordance with the third embodiment of the invention can be understood with reference to FIGS. 11-15. Installation of the blade cutting tip 302 is accomplished by placing blade cutting tip plate in contact with the generally flat neck portion 332 of blade base member 302, aft of the generally U-shaped in cross section end portion 334. The cutting tip 302 is then shifted such that the wings 338, 340 of blade tip end portion 334 are received within slots 322, 324 of the blade cutting tips 304. Blade cutting tip 304 is snapably retained on the blade base member 302 by either of the retention mechanisms depicted in FIGS. 13-15. A screwdriver or similar implement can be inserted through apertures 326 and 342 of the cutting tip and neck portion respectively to assist the installation and removal of the blade cutting tip 304 to the blade base member 302.

I claim:

1. A blade assembly for a rotary lawn mower or the like, comprising:

a blade base member adapted for rotation in a cutting plane, said blade base member defining a blade longitudinal axis and including a blade base member and portion having an end portion first width generally parallel to said cutting plane and generally perpendicular to said longitudinal axis;

a blade cutting element presenting a cutting edge;

attachment means for detachably coupling said blade cutting element to said blade base member, said attachment means comprising bracket means operably coupled to said cutting element and defining a blade base member end portion receiving channel for receiving said end portion in a complimentary fit;

said bracket means comprising a pair of opposed bracket elements depending from said cutting element and adapted for generally parallel alignment with said blade longitudinal axis, each bracket element including a bracket element sidewall and a bracket element top wall, said bracket element sidewalls mutually defining a bracket means width just larger than said end portion first width, and said bracket element top wall presenting a channel opening defining a channel opening width smaller than said end portion first width, said blade base member and portion including structure presenting an end portion second width generally parallel to said cutting plane and generally perpendicular to said longitudinal axis, said end portion second width being smaller than said channel opening width whereby said bracket means and said cutting element are receivable by said base member at said second end portion width, and can be shifted along said longitudinal axis for capturing said end portion first width within said channel.

2. The invention as claimed in claim 1, said blade base member end portion presenting an end portion cross bar having a width larger than said bracket means width, said cross bar presenting a base member outer margin, said base member first width being inwardly from said cross bar, and said base member second width being inwardly from said base member first width.

3. The invention as claimed in claim 2, said attachment means further including means operably coupled to said cutting element for snapably engaging said base member outer margin whereby said cutting element is inhibited from shifting inwardly from said cross bar along said base member longitudinal axis.

4. The invention as claimed in claim 3, said blade cutting element including structure defining a first blade assembly aperture, said blade base member including structure defining a second blade assembly aperture, said first and second blade assembly apertures being generally aligned when said cutting element is installed on said base member whereby an implement can be received through said apertures to assist in the removal or installation of said cutting element from said base member.

5. The invention as claimed in claim 1, said blade base member including a cross bar oriented generally perpendicular to said axis and generally parallel to said cutting plane, said cross bar presenting a cross bar width greater than said end portion first width, said attachment means comprising a pair of opposed bracket element spaced apart by a distance greater than said end portion first width and less than said cross bar width, said bracket elements each including a cross bar locking element spaced apart from said cutting element for receiving said cross bar between said cutting element and said locking elements.

6. A blade assembly for a rotary lawn mower or the like, comprising:
- a blade base member, said base member including a generally planar end portion;
- a blade cutting element presenting a cutting edge, said blade cutting element comprising a generally planar plate, said plate including structure defining a pair of generally parallel slots; and
- attachment means for detachably coupling said blade cutting element to said blade base member, said attachment means comprising a pair of generally parallel elements projecting outwardly from said generally planar end portion and receivable within said cutting element slots.

* * * * *